United States Patent [19]

Baer

[11] 4,157,326
[45] Jun. 5, 1979

[54] PREPARATION OF GLASS CONCENTRATE CAPSULES FOR REINFORCEMENT OF THERMOPLASTICS

[75] Inventor: Massimo Baer, Longmeadow, Mass.

[73] Assignee: Monsanto Company, St. Louis, Mo.

[21] Appl. No.: 855,139

[22] Filed: Nov. 28, 1977

[51] Int. Cl.² .............................................. C08K 9/10
[52] U.S. Cl. ................................ 260/42.18; 428/361; 260/42.14
[58] Field of Search ......................... 260/42.18, 42.14; 427/361

[56] References Cited

U.S. PATENT DOCUMENTS

| | | | |
|---|---|---|---|
| 2,877,501 | 3/1959 | Bradt | 260/42.18 X |
| 3,650,810 | 3/1972 | Marzocchi | 260/42.18 X |
| 3,671,384 | 6/1972 | Baer et al. | 260/42.18 X |
| 3,694,402 | 9/1972 | Essam | 260/40 P |
| 3,984,603 | 10/1976 | Zechinati | 260/42.18 X |
| 4,037,011 | 7/1977 | Hattori et al. | 260/42.18 X |

*Primary Examiner*—Sandra M. Person
*Attorney, Agent, or Firm*—R. Bruce Blance; William J. Farrington; James C. Logomasini

[57] ABSTRACT

Disclosed herein are glass concentrate capsules useful in forming reinforced thermoplastic resin composites, said capsules comprising 50 to 90% by weight of glass strands having a length of from about 0.80 to about 20 mm which strands are arranged in a substantially collimated array within a low molecular weight crystalline organic material, wherein the individual strands in the collimated array and the collimated array of glass strands are encapsulated in the low molecular weight crystalline organic material.

25 Claims, 6 Drawing Figures

U.S. Patent   Jun. 5, 1979   4,157,326
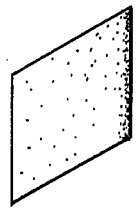
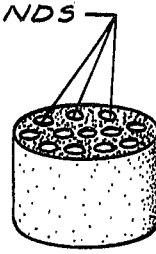
Fig.1.   Fig.1A.
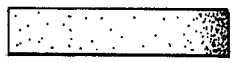
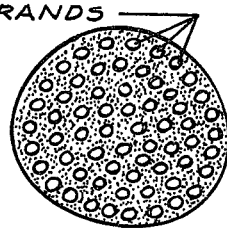
Fig.2.   Fig.2A.
Fig.3.   Fig.3A.

PREPARATION OF GLASS CONCENTRATE CAPSULES FOR REINFORCEMENT OF THERMOPLASTICS

BACKGROUND OF THE INVENTION

The present invention is directed to glass concentrate capsules which comprise a plurality of strands of glass fibers encapsulated in a collimated array within a low molecular weight crystalline organic compound, to a process of manufacture of such capsules, to thermoplastic resins reinforced with such capsules and to a process of reinforcement of thermoplastic resins by coextrusion with such capsules.

The use of glass fibers as a reinforcing medium in thermoplastic resin composites is well known in the prior art.

In the preparation of glass fiber reinforced composites it is conventional to use segments of glass fiber strands which vary in length from 0.80 to 20 mm or longer. These glass strands are conventionally made up from 200 to 800 filaments having a diameter in the order of 8 to 15 microns arranged in a parallel configuration. The surface of the glass strand is conventionally coated with a coupling agent and a film forming size which keeps the microfibers together and maintains the integrity of the strand. The glass strands are chopped into segments of uniform length and are then dry blended with a thermoplastic resin matrix and fed to an extruder or injection molding machine wherein the fibers are distributed throughout the resin matrix and serve as reinforcing elements in the finished composite.

Dry-blending of the glass and resin matrix is considered to be the simplest, most versatile and economical route for large volume preparation of composites. However, such dry-blending involves high capital investment for the equipment necessary to avoid the very severe problems of non-uniformity of glass distribution and segregation, debundling, bridging, haystacking and matting of glass during blending, feeding and processing. Consequently, special vibrator proportioning and metering feeds are required.

Debundling is the term used to describe that occurrence where the glass strand loses it intregity and the individual microfibers are scattered. The loose microfibers can undergo bridging or form haystacking configurations (haystacking) in the hopper which feeds the extruder or injection molding machine. As a result of this haystacking, the desired feed ratio of glass fibers to resin matrix in the molding or extrusion operation can be upset and an inferior product is produced. Alternatively, the haystack can be fed to the machine in the nature of an embolus and causes matting of the glass fibers, clogging of the machinery and production of inferior non-uniform products.

Attempts to solve the problems of debundling and haystacking led researchers to coat the glass strand with thermoplastic resin polymers. Bradt, in U.S. Pat. No. 2,877,501, teaches coating the outside of an endless glass strand with a polymeric coating followed by heat treatment to fuse the polymer then cutting the strand to the desired length. In this method, the cut ends of the glass strands contain exposed ends of microfibers and are possible sites for subsequent debundling. Moreover, there is a polymer gradient which decreases toward the center of the strand. Consequently, the individual microfibers in the core of the strand may not be coated with polymer. Thus, the shearing forces of injection molding or extrusion could cause abrasion of the individual microfibers in the core of the strand with resulting damage to these fibers which detracts from their reinforcing ability.

Malinowski et al. in U.S. Pat. No. 2,688,774, Herman et al. in U.S. Pat. No. 3,265,644; and Wiczer in U.S. Pat. No. 3,278,329 provide a partial solution to the problems mentioned above by coating the glass strand with monomer followed by in situ polymerization to give a single glass strand contained within a thermoplastic resin capsule. In some instances the monomers wet the individual microfibers and upon polymerization provide a coating which helps to protect the microfibers from the adverse effects of abrasion during composite preparation.

However, in the foregoing methods, it is not possible to obtain a high concentration of glass fibers in capsule form which is a desired feature in the preparation of glass filled composites. Moreover, in many instances the capsules of the prior art, which contain a single glass strand, rather than a plurality of collimated glass strands, have a different density, size and shape than the particles of resin matrix being fed to the extruder or molding apparatus. These differences may result in segregation of the respective particles and a non-uniform product.

Baer, in U.S. Pat. No. 3,671,384 discloses a process of manufacture of glass concentrate capsules which contain a high concentration of glass strands arranged in a collimated array encapsulated with a thermoplastic vinyl polymer. These capsules can be used for reinforcement of thermoplastic resin matrices of homo- and copolymers of vinyl chloride and homo- and copolymers of styrene. The desired encapsulation is obtained by: wetting the strands with vinyl monomers, dispersing them in an aqueous medium containing a suspending agent, and polymerizing the monomers. The fluidity of the monomers permits the stacking of the strands to build capsules by interfacial and hydrodynamic forces. The capsules preserve their integrity while going through the transition from fluid monomers, to viscous syrup, to solid polymers. A problem with vinyl polymers as encapsulating materials is that these polymers are not molecularly dispersible in some matrices (for example, polyesters, nylons, polycarbonates). Hence, when they are used for reinforcement of such matrices damage to some mechanial properties can occur. A further problem exists in the presence of suspending agent which can interact with the thermoplastic matrix and can cause impairment of certain physical and mechanical properties. A further problem exists in the extended period of time required to effect encapsulation.

SUMMARY OF THE INVENTION

The present invention solves the problems discussed above by providing glass concentrate capsules which contain a high concentration of glass strand segments arranged in a collimated array within a low molecular weight crystalline organic material. In the capsules the individual microfibers in the strand segments are also coated with the low molecular weight crystalline organic material. These capsules can be prepared in a variety of sizes and shapes, by controlling conditions in order to decrease the problem of segregation. The glass concentrate capsules of the present invention allow a significant reduction in the need for the elaborate precautions heretofore used in the prior art in order to insure a uniform and constant feed rate of glass and matrix resin to the processing machinery. Furthermore, the problems of debundling, haystacking and matting, and abrasion of glass fibers which are commonly associated with the glass strands of the prior art are virtally eliminated and a substantial reduction in melt viscosity can be achieved. Moreover, the glass concentrate capsules of the present invention can be blended with a thermoplastic matrix resin to prepare composites with improved physical properties such as lower water absorption, higher impact strength, higher modulus, or improved resistance to heat distortion.

Furthermore, the problems of lack of molecular dispersibility of the encapsulating vinyl polymers of the prior art in the resin matrix are readily overcome since the low molecular weight crystalline organic material can be selected to be compatible with the matrix polymer. The crystalline organic material is preferably of such melting point that fast drying of the glass capsules at a temperature below the melting point of the crystalline organic material can be achieved and can be further selected to impart fire retardance, lubricity, etc., to the thermoplastic matrix polymer.

The capsules can be prepared by forming a mixture of molten encapsulating agent, glass strand segments and water containing a suspending agent if necessary, agitating the mixture under conditions of low shear to allow dispersion of the glass strand segments in substantially collimated array and cooling to a temperature below the melting point of the low molecular weight crystalline organic material to provide capsules wherein the glass strand segments are in substantially collimated array. Advantages of this process of encapsulation lie in the very short period of time required to effect encapsulation and in the ability to dispense with suspending agents.

DESCRIPTION OF THE DRAWINGS

The drawings are diagrammatic and not drawn to scale.

FIG. 1 is a plan view of a glass concentrate capsule of the present invention.

FIG. 1A is a front view of the capsule shown in FIG. 1 with the top of the capsule cut away to expose the ends of the glass strand segments. Note that the glass strand segments are aligned in a collimated array and are surrounded with encapsulating agent. In practice, collimation allows a very close packing of the strands to provide a high concentration of glass within the capsule.

FIGS. 2 and 3 are plan views of other types of glass concentrate capsules prepared according to the present invention.

FIGS. 2A and 3A are top views of the capsules shown in FIGS. 2 and 3. In these views the top has been cut away to expose the ends of the glass strand segments. Once again note that the glass strands are aligned in a collimated array which allows a very close packing of the strands to provide a high concentration of glass within the capsule.

DESCRIPTION OF THE PREFERRED EMBODIMENTS

In the practice of the present invention, from about 50 to about 90 parts by weight glass strands chopped into segments of substantially uniform length are encapsulated in a collimated array with from about 50 to about 10 parts by weight of a low molecular weight crystalline organic compound, based on 100 parts by weight total of glass and crystalline organic compound. The glass concentrate capsules are prepared by forming a mixture of molten encapsulating agent, chopped glass strand segments and water or if necessary, an aqueous dispersion of a suspending agent, applying low shear agitation to the mixture until a substantially uniform dispersion of glass concentrate capsules is obtained, cooling the dispersion below the melting point of the crystalline organic compound and recovering and drying the glass concentrate capsules. The process of encapsulation can be carried out in minutes compared with hours for the prior art processes. When crystalline organic compounds such as N-substituted sulfonamides are used which are highly polar and can easily displace water from the surface of the glass strand segments, the strand segments can be first wet with water or an aqueous dispersion of suspending agent, crystalline organic compound is added and the mixture is heated to above the melting point of the crystalline organic compound while low shear agitation is applied to form the glass concentrate capsules. Alternatively, the crystalline organic compound and the glass strand segments can be added to water and the mixture is heated to above the melting point of the crystalline organic compound while low shear agitation is applied to form the glass concentrate capsules. However, preferably the crystalline organic compound is melted in the presence of the glass strand segments prior to addition of hot water or a hot aqueous dispersion of suspending agent and low shear agitation is applied to form the glass concentrate capsules.

The amount of water used in the process of encapsulation will vary from 100 to 1600 parts by weight, preferably from 100 to 600 parts by weight, based on 100 parts by weight total of the glass and crystalline organic compound. Larger quantities of water can be used but no advantage is gained. The amount of suspending agent varies for each system depending on the hydrophilic-hydrophobic balance of the crystalline organic compound and must be determined for each system. In general, the amount of the suspending agent used will fall in the range of from 0 to 2.0% by weight based on the total weight of the glass and crystalline organic compound. In some cases, particularly with highly polar organic materials and with low concentrations of organic materials, encapsulation can be obtained in the absence of suspending agent.

During the low shear agitation the glass strand segments which are impregnated and coated with crystalline organic compound align themselves into a substantially collimated array to form regular or irregular cylinders which may be elliptic, oval or circular in cross-section. The length of the capsules is generally slightly greater than the length of the original chopped strands. The microfibers which form the glass strands are also surrounded by and embedded in the crystalline organic compound.

The glass component used in the present invention comprises segments of strands of glass fibers varying in length from about 0.8 to about 20 mm. or longer. Preferably, the glass strands are about 3 to about 8 mm. long and about 0.1 to about 1.0 mm.$^2$ in cross section area. The glass strands are preferably sized with conventional size to allow ready wetting of the glass fiber with the molten organic compound.

The low molecular weight crystalline organic compound which is used as the encapsulating agent preferably has a melting point above about 40° C. and a number average molecular weight not greater than about 2000. More preferably, the melting point should be above about 80° C. so that the glass concentrate capsules may be dried at elevated temperature after recovery from the aqueous dispersion, without fusing together, and should be less than the temperature of decomposition of the thermoplastic resin matrix which is intended to be reinforced by co-extrusion with the glass concentrate capsules. The encapsulating agent should be substantially water insoluble and have a solubility in water at the temperature of encapsulation of no more than 5 parts by weight, per 100 parts of water, preferably less than 1 part per 100 parts of water and even more preferably less than 0.2 parts per 100 parts of water so that an excessive amount is not lost in water solution during the dispersion process. The encapsulating agent can advantageously be selected to be compatible with the thermoplastic resin matrix which is intended to be reinforced by co-extrusion with the glass concentrate capsules. Thus, for a polyamide resin matrix, the glass encapsulating agent can be sulfonamides such as o- and p-toluenesulfonamides, N-ethyl-p-toluenesulfonamide and N-cyclohexyl-p-toluenesulfonamide; for linear aromatic polyesters and carbonates, the glass encapsulating agent can be triphenyl phosphate, the sulfonamides listed hereinabove, and phthalates such as dicyclohexylphthalate; for vinyl chloride polymers, the glass encapsulating agent can be dicyclohexyl phthalate, diphenyl phthalate and N-cyclohexyl-p-toluenesulfonamide; for cellulosics, the glass encapsulating agent can be diphenyl phthalate, N-ethyl-p-toluenesulfonamide and N-cyclohexyl-p-toluenesulfonamide; for polyvinyl formal, the glass encapsulating agent can be N-ethyl-p-toluene sulfonamide; and for styrene polymers, the glass encapsulating agent can be dicyclohexyl phthalate. When increase in fire retardance of the thermoplastic resin matrix is desired, the glass encapsulating agent can be selected from a wide range of halogenated organic compounds such as decachlorodiphenyl ether, decabromodiphenyl ether, hexabromobenzene, hexabromodiphenyl, the solid flame retardants sold by Hooker Chemical Co. under the trade name "Dechlorane" and the chlorinated coal tar resins sold by Monsanto Company under the registered trademark "Montar." Phosphate plasticizers such as triphenyl phosphate and triphenylphosphine oxide also enhance fire retardance. Lubricity can be increased by selecting organic compounds as the glass encapsulating agent which are of limited compatibility with the thermoplastic matrix. Gloss of the reinforced composition can be enhanced by glass encapsulating agents such as ortho or para toluenesulfonamide.

When the selected encapsulating agent melts at a temperature above 100° C. the encapsulating process is carried out in a pressure vessel at a temperature high enough to melt the encapsulating agent.

In some cases it is found desirable to dissolve a polymer in the molten encapsulating agent as a binder to impart improved integrity to the capsules during handling. The polymeric material must be soluble or dispersible in the encapsulating agent, should preferably not depress the solidification point of the encapsulating agent and should preferably be relatively insoluble in water with a partition coefficient between the encapsulating agent and water of at least about 9. With these criteria as a guide, the polymer binder may be selected from the wide variety of vinyl addition polymers and condensation polymers and may conveniently be identical with the intended matrix polymer. The amount of polymer used as a binding agent for the capsules is at least sufficient to improve the intregity of the capsules without impairing the ability of the molten encapsulating agent to be absorbed by the chopped glass strands. The amount of polymer is preferably in an amount up to about 10 weight percent of the encapsulating agent. The molecular weight of the polymer is selected so that it is sufficient to allow the polymer to perform as a binder but is not so high that the polymer dissolves too slowly in the encapsulating agent or the rate at which the molten encapsulating agent is absorbed by the glass strand segments is substantially impaired. Thus, the number average molecular weight can be in the range of about 2000 to about 100,000 and is preferably in the range of about 5000 to about 50,000. In general, the binding efficiency is greater at the higher molecular weights and the amount of polymer for effective binding is reduced.

Preferential wetting of the glass strand segments by the molten organic material is a necessary requirement for successful collimation and encapsulation. Moreover, preferential wetting of the glass with the molten organic compound encourages absorption onto the microfibers of the strands by capillary action. Thus, when the capsules are cooled to solidify the organic compound, the individual microfibers as well as the aligned strands are fully surrounded and protected by the crystalline organic compound. If the glass fibers are not wetted sufficiently, only single glass strand segments are encapsulated, collimation of a plurality of segments does not take place and the efficiency of protection of the glass fibers is reduced. Control of the sizes and shapes of the glass concentrate capsules can be obtained by varying the concentration of suspending agent and the degree of shearing during agitation of the dispersion.

When a suspending agent or protective colloid is required in the encapsulation process, the amount used depends on factors such as the length of glass strands, the polarity of the encapsulating agent, the ratio of glass to encapsulating agent, the ratio of water to encapsulating agent and the water solubility of the encapsulating agent. Larger concentrations of suspending agent are required with longer glass strands. The optimum amount of protective colloid is dictated by the size, shape and uniformity desired in the resulting glass concentrate capsules.

When excessive protective colloid is used there is no aligning of the glass strands into a collimated array and only a thin coating of encapsulating agent is found on the individual strands. Most of the encapsulating agent will be present as fine suspension beads. When insufficient protective colloid is used there is no aligning of glass strands into a collimated array. Moreover, the encapsulating agent forms into oversized beads and coalescence of the beads occurs. When using an optimum amount of protective colloid, the glass strands are individually coated with encapsulating agent and are aligned in bundles in a substantially collimated array to form capsules. The preferred capsules pass through a number 2.5 U.S. Standard Screen and are retained on a number 40 screen. The more preferred capsules are those that pass through a number 4 screen and are retained on a number 20 screen. When optimum amounts of protective colloids are used, few fine particles of encapsulating agent without glass strands are formed.

Examples of protective colloids for use in the present invention include those synthetic and naturally occurring materials which are well known to those skilled in the art. These include polyvinyl alcohol, partially hydrolyzed polyvinyl acetate, soluble starch, soluble starch derivatives, dextrin, gum tragacanth, gum arabic, gum acacia, gum tragon, gelatin, agar-agar, methyl cellulose, methylhydroxypropyl cellulose, ethylhydroxyethyl cellulose, sodium alginate, sodium silicate, tricalcium phosphate, salts of polycarboxylic acids such as the sodium salts of polyacrylic acid, partial esters of polymethacrylic acid, copolymers of acrylic acid and 2-ethyl hexyl acrylate, copolymers of vinylacetate and maleic anhydride and the like.

Especially preferred protective colloids include polyvinyl alcohol, partially hydrolyzed polyvinyl acetate, bentonite, methyl cellulose, partial esters of polymethacrylic acid and copolymers of acrylic acid and 2-ethyl hexyl acrylate which are described in U.S. Pat. No. 2,945,013 and copolymers of vinyl acetate maleic anhydride.

The type of agitation used during the encapsulation process is critical. Encapsulation and collimation of the fibers is only successfully achieved when low shear agitation of the type that causes the whole mass to move without causing localized high shear agitation is used. Suitable agitation may be achieved by a slowly tumbling reactor, or in those types of horizontal reactors where the entire mass is moved in a cascading type motion.

The glass concentrate capsules of the present invention comprise from about 50 to about 90 percent by weight of glass. More preferably, the capsules comprise from about 60 to about 85 percent by weight of glass. Conversely, the capsules comprise from about 50 to about 10 percent by weight of encapsulating agent and more preferably from about 40 to about 15 percent by weight of encapsulating agent.

The glass concentrate capsules contain a plurality of glass strands preferably from about 3 to about 200 glass strands per capsule and more preferably from about 5 to about 40 glass strands per capsule since this number corresponds to a convenient capsule size for blending with the thermoplastic resin matrix. As stated above, these strands are encapsulated in a substantially collimated array within the encapsulating agent. The substantially collimated array allows close packing of the glass strands which, in turn, provides a capsule with a high concentration of glass so that excessive dilution of the thermoplastic resin matrix with encapsulating agent does not occur. The final size, shape and composition of the glass concentrate capsules will depend on the particular system and encapsulation conditions used. These properties will be dictated by the particular end use requirements. In general, the capsules are prepared so that they can be blended with the thermoplastic resin matrix in the form of powder, beads or extruded chips, without encountering problems of segregation or non-uniformity.

An advantage of the glass concentrate capsules of the present invention is that they allow intimate blending by melting and co-extrusion of mixtures of the capsules and the powder, beads or chips of thermoplastic resin to form a reinforced thermoplastic resin without the problems of prior art processes wherein debundling, haystacking and bridging of the glass fiber tends to occur. In a preferred embodiment metered quantities of the capsules and the thermoplastic resin are fed directly to an injection molding machine to provide shaped or molded reinforced articles without the need for a prior dry or melt blending step. The ratio of encapsulating agent to glass strands to thermoplastic resin matrix is readily selected by the practitioner of the resin reinforcing art to obtain the desired degree of reinforcement. In general, the reinforcing amount of glass fiber is in the range of about 5 to about 60 weight percent and is preferably in the range of about 10 to about 40 weight percent based on the total weight of thermoplastic resin, glass fiber, reinforcing agent and crystalline organic encapsulating agent.

The following examples are set forth in illustration of this invention and should not be construed as a limitation thereof. Unless otherwise indicated, all parts and percentages given are by weight.

EXAMPLE 1

This example illustrates the preparation of glass concentrate capsules containing 80 weight percent of glass strand segments encapsulated in collimated array within diphenyl phthalate and the blending of the capsules with polybutylene terephthalate.

80 Parts by weight of chopped glass strands, 4.75 mm. long, sold by Owens Corning Fiberglass Corporation under the trade designation O.C. 419AA, and 20 parts by weight of diphenyl phthalate are heated in a vessel at 100° C. to melt the diphenyl phthalate and allow it to coat and be absorbed by the glass strands. 500 Parts by weight at 90°–95° C. is added and the slurry is agitated by gently turning the vessel end-over-end at 85° C. for 10 minutes. Agitation is continued and the slurry is cooled to room temperature with resulting solidification of the collimated capsules. The capsules are filtered from the slurry, washed with warm water and dried at 65° C. The filtrate is clear, indicating essentially no fine particles of diphenyl phthalate have been formed. 100 Parts by weight of encapsulated glass segments are recovered. The average capsule is about 12 to 15 times the weight of the original chopped strand segments. Examination of a cross-section of representative capsules shows a plurality of glass strands in a substantially collimated array wherein the microfibers in the strands are also encapsulated by diphenyl phosphate. Other representative capsules are heated in a muffle furnace in order to volatilize the diphenyl phosphate exposing a plurality of glass strands in a substantially collimated array.

A reinforced polyester part is prepared by metering the capsules and pellets of polybutylene terephthalate molding resin into an Arburg injection molding machine at a temperature of 260° C. and injecting the melt blend into a mold at 100° C. No debundling or haystacking problems are encountered during the blending process.

EXAMPLE 2

Example 1 is repeated. The collimated capsules obtained are on average 15 times the weight of the original individual chopped strand segments and are uniform in size.

EXAMPLE 3

This example demonstrates the use of a suspending agent in the preparation of collimated capsules.

Example 1 is repeated with chopped glass strands 6.35 mm. in length sold by Johns-Manville under the trade designation 308-A GF. 0.06 Part by weight of suspending agent, a copolymer comprising 95.5 mol percent acrylic acid and 4.5 mol percent 2-ethylhexyl acrylate prepared according to the teaching of U.S. Pat.

No. 2,945,013, is added to the water. No emulsification of the diphenyl phthalate occurs and no fine particles are recovered. The resulting small capsules contain glass strands in collimated array.

EXAMPLE 4

This example demonstrates the effect of excessive amounts of suspending agent.

Example 1 is repeated with 0.2 parts by weight of the suspending agent added to the water. No collimation of the glass fiber strands is obtained. The diphenyl phosphate forms an emulsion and is unable to encapsulate the strands.

EXAMPLE 5

This example illustrates the preparation of glass concentrate capsules containing 80 weight percent of glass strand segments encapsulated in collimated array within N-cyclohexyl-p-toluenesulfonamide and the blending of the capsules with nylon 6,6 to form a glass fiber reinforced composite.

The process of Example 1 is repeated with N-cyclohexyl-p-toluenesulfonamide in place of diphenyl phthalate. Agitation is carried out at 90° C. 100 Parts by weight of encapsulated, collimated glass segments are recovered. The average capsule is about 24 times the weight of the original individual chopped strand segments.

The glass concentrate capsules, 75.3 parts by weight, are mixed with 225 parts by weight of a nylon 6,6 molding powder of intrinsic viscosity of 1.20, determined at 25° C. in 90 percent aqueous formic acid. The mixture is intimately blended by a double-pass extrusion with a Brabender screw at 40 rpm and 271° C. through a die at 268° C. and the extrudate is cooled and chopped into pellets. The feeding of the mixture is easily accomplished without bridging or haystacking of the glass strands and an essentially colorless product exhibiting superior dispersion of the glass in the extrudate is obtained. Its heat distortion temperature under a load of 1819 kPa is 236° C. In contrast when a mixture of the nylon molding resin and the glass strands or a mixture of the nylon molding resin, the glass strands and N-cyclohexyl-p-toluenesulfonamide in amounts to provide the same weight ratios of nylon to glass and nylon to N-cyclohexyl-p-toluenesulfonamide as in the mixture of glass concentrate capsules and nylon molding resin, is intimately blended by double-pass extrusion with a Brabender screw under the same conditions, feeding in the hopper is difficult because of frequent bridging and the products of such blending show poorer dispersion of the glass and are slightly discolored. The heat distortion temperature of the blend of nylon molding resin, glass strands and N-cyclohexyl-p-toluenesulfonamide under a load of 1819 kPa is 205° C., which is some 20° C. less than the heat distortion temperature of the equivalent blend prepared from the glass concentrate capsules.

EXAMPLE 6

This example illustrates the use of a polymeric binder in the encapsulating agent.

The process of Example 1 is repeated with a melt blend of 19 parts by weight of diphenyl phthalate and 1 part by weight of poly(ethyl acrylate) in place of the 20 parts by weight of diphenyl phthalate. The recovered capsules possess greater impact resistance and integrity than the capsules of Example 1. They are readily melt blended with pellets of polybutylene terephthalate and the melt blend yields uniform molded parts when it is injection molded.

What is claimed is:

1. Glass concentrate capsules comprising a plurality of glass strand segments of length in the range of about 0.8 to about 20 mm. arranged in a substantially collimated array within a substantially water insoluble crystalline organic encapsulating agent of number average molecular weight of about 2000 or less, wherein the capsules contain from about 50 to about 90 percent by weight of glass and wherein each strand segment comprises a plurality of microfibers.

2. The glass concentrate capsules of claim 1 wherein the encapsulating agent melts above 80° C.

3. The glass concentrate capsules of claim 1 having from about 60 to about 85 percent by weight of glass.

4. The glass concentrate capsules of claim 1 wherein the capsules have a particle size such that they pass through a 2.5 U.S. Standard Screen and are retained by a 40 U.S. Standard Screen.

5. The glass concentrate capsules of claim 4 wherein the glass strand segments have a length of from about 3 to about 8 mm. and wherein there are from about 3 to about 200 glass strand segments per capsule.

6. The glass concentrate capsules of claim 5 wherein there are from about 5 to about 40 glass strand segments per capsule.

7. The glass concentrate capsules of claim 5 used in reinforcing a thermoplastic resin, wherein the encapsulating agent is a plasticizer for the thermoplastic resin.

8. The glass concentrate capsules of claim 7 wherein the encapsulating agent contains up to about 10 weight percent of a polymeric binder.

9. A process for the preparation of glass concentrate capsules comprising a plurality of glass strand segments of length in the range of about 0.8 to about 20 mm. arranged in substantially collimated array within a substantially water insoluble crystalline organic encapsulating agent of number average molecular weight of about 2000 or less, wherein the individual glass strand segments comprise a plurality of microfibers, which process comprises:
   A. forming a mixture of molten encapsulating agent, glass strand segments and water;
   B. applying low shear agitation to the mixture until a substantially uniform dispersion of encapsulated glass strand segments arranged in substantially collimated array within the encapsulating agent is obtained;
   C. cooling the dispersion below the melting point of the encapsulating agent; and
   D. recovering and drying the capsules.

10. The process of claim 9 wherein the capsules comprise from about 50 to about 90 weight percent glass and there are from about 3 to about 200 glass strand segments per capsule.

11. The process of claim 10 wherein the water contains a suspending agent in amount up to about 2.0 percent by weight of glass strands and encapsulating agent.

12. The process of claim 11 wherein the suspending agent is an interpolymer of acrylic acid and 2-ethylhexyl acrylate.

13. The process of claim 9 wherein the glass strand segments have a length of from about 3 to about 8 mm.

14. A thermoplastic resin reinforced with a reinforcing amount of glass fiber by intimately blending the resin with the glass concentrate capsules of claim 1.

15. A thermoplastic resin reinforced with a reinforcing amount of glass fiber by intimately blending the resin with the glass concentrate capsules of claim 5.

16. A thermoplastic resin reinforced with a reinforcing amount of glass fiber by intimately blending the resin with the glass concentrate capsules of claim 6.

17. A thermoplastic resin reinforced with a reinforcing amount of glass fiber by intimately blending the resin with the glass concentrate capsules of claim 7.

18. A thermoplastic resin reinforced with a reinforcing amount of glass fiber by intimately blending the resin with the glass concentrate capsules of claim 8.

19. A process for reinforcing a thermoplastic resin with a reinforcing amount of glass fiber which comprises intimately blending the thermoplastic resin with the glass concentrate capsules of claim 1.

20. A process for reinforcing a thermoplastic resin with a reinforcing amount of glass fiber which comprises intimately blending the thermoplastic resin with the glass concentrate capsules of claim 5.

21. A process for reinforcing a thermoplastic resin with a reinforcing amount of glass fiber which comprises intimately blending the thermoplastic resin with the glass concentrate capsules of claim 6.

22. A process for reinforcing a thermoplastic resin with a reinforcing amount of glass fiber which comprises intimately blending the thermoplastic resin with the glass concentrate capsules of claim 7.

23. A process for reinforcing a thermoplastic resin with a reinforcing amount of glass fiber which comprises intimately blending the thermoplastic resin with the glass concentrate capsules of claim 8.

24. A process for reinforcing a thermoplastic resin with a reinforcing amount of glass fiber which comprises preparing glass concentrate capsules by the process of claim 9 and intimately blending the thermoplastic resin and the glass concentrate capsules.

25. A process for reinforcing a thermoplastic resin with a reinforcing amount of glass fiber which comprises preparing glass concentrate capsules by the process of claim 10 and intimately blending the thermoplastic resin and the glass concentrate capsules.

* * * * *

UNITED STATES PATENT AND TRADEMARK OFFICE
CERTIFICATE OF CORRECTION

PATENT NO. : 4,157,326
DATED : June 5, 1979
INVENTOR(S) : Massimo Baer

It is certified that error appears in the above-identified patent and that said Letters Patent are hereby corrected as shown below:

Column 3, line 66, "with" should read --- within ---.

Column 8, line 27, after "weight" insert --- of water ---.

Signed and Sealed this

Twenty-eighth Day of August 1979

[SEAL]

Attest:

Attesting Officer

LUTRELLE F. PARKER
*Acting Commissioner of Patents and Trademarks*